United States Patent [19]
Maisenbacher et al.

[11] Patent Number: 4,925,273
[45] Date of Patent: May 15, 1990

[54] VARIABLE OPTICAL ATTENUATOR

[75] Inventors: Bernd Maisenbacher, Schomberg; Siegmar Schmidt, Wildberg, both of Fed. Rep. of Germany

[73] Assignee: Hewlett-Packard Company, Palo Alto, Calif.

[21] Appl. No.: 40,914

[22] Filed: Apr. 21, 1987

[30] Foreign Application Priority Data

Apr. 21, 1986 [DE] Fed. Rep. of Germany ....... 3613688

[51] Int. Cl.$^5$ .............................................. G02B 5/22
[52] U.S. Cl. ..................................... 350/315; 350/314; 350/275; 250/234; 356/434; 356/4; 358/228
[58] Field of Search ............... 350/311, 313, 314, 318, 350/315, 165, 274, 273, 275; 250/234, 235; 356/434, 4; 358/228

[56] References Cited

U.S. PATENT DOCUMENTS

| | | |
|---|---|---|
| 990,303 | 4/1911 | Shreiner . |
| 3,193,687 | 7/1965 | Hatcher ............................... 350/314 |
| 3,372,282 | 3/1968 | Bressler ............................... 350/314 |
| 3,493,748 | 2/1970 | Tajima ................................. 350/315 |
| 3,538,335 | 11/1970 | Tartamian ........................... 250/234 |
| 3,901,596 | 8/1975 | Vincent et al. ...................... 350/314 |
| 3,926,525 | 12/1975 | Sheldrick ............................. 350/314 |
| 4,325,083 | 4/1989 | Rouchon et al. .................... 358/228 |
| 4,560,252 | 12/1985 | Mori ..................................... 350/315 |

FOREIGN PATENT DOCUMENTS

| | | |
|---|---|---|
| 750941 | 5/1943 | Fed. Rep. of Germany . |
| 2136299 | 2/1973 | Fed. Rep. of Germany . |
| 1472196 | 12/1979 | Fed. Rep. of Germany . |
| 2848294 | 2/1980 | Fed. Rep. of Germany . |
| 3041375 | 6/1982 | Fed. Rep. of Germany . |
| 3223898 | 1/1984 | Fed. Rep. of Germany . |

OTHER PUBLICATIONS

Hewlett–Packard Journal, 1/85, pp. 7–18, A Precise Progamamble 850—nm Optical Signal Source.
Camera, nr. 4 Apr. 1959, Schweiz fr. 2.50, Deutschland DM3., Photo-Nachrichten, p. 44.
Einfuhrung in die theoretische Physik, Dr. Clemens Schaefer, p. 548.
Laser & Applications, May 1984, pp. 91–93, Attenunator Applications for Fiberoptics.

*Primary Examiner*—Bruce Y. Arnold
*Assistant Examiner*—Loha Ben
*Attorney, Agent, or Firm*—Douglas A. Kundrat

[57] ABSTRACT

A variable optical attenuator includes incoming and outgoing surfaces which are inclined relative to each other so that light reflected at an attenuating coating on one or both surfaces is reflected away from the optical path to avoid interference effects. The attenuating coating varies in density depending upon the angle of rotation of the attenuator. Variable attenuation may be achieved by rotating the attenuator a predetermined amount under microprocessor control.

11 Claims, 1 Drawing Sheet

VARIABLE OPTICAL ATTENUATOR

BACKGROUND AND SUMMARY OF THE INVENTION

In order to characterize a component of an optical system it is often necessary to apply a light beam of varying power to the system. The performance of the component may be characterized by observing its performance under different light power conditions. In this manner, an attenuated laser light beam may be used in the characterization of components such as receiver diodes, transmission paths and light amplifiers. Beam attenuation may also be used to simulate transmission paths of different lengths.

An optical attenuator may consist of a thin glass wafer coated with an optically attenuating material Unfortunately, this type of attenuator often causes reflection and undesired modulation of the light beam due to superposition of the reflected light beams onto the primary beam.

In accordance with the illustrated preferred embodiment of the present invention an optical attenuator provides variable attenuation without undesired modulation. The attenuator has an uncoated incoming surface which is orthogonal to the light beam. The outgoing surface is coated with an optically attenuating material and is inclined relative to the incoming surface so that light reflected at the outgoing surface is reflected away from the optical path of the incoming beam. The optical density of the attenuating coating varies with the angle of rotation of the attenuator. The coating may form an attenuation ring whose attenuation rises continuously over the angular range of zero to 360 degrees or less. During use, the attenuator may be rotated a pre-determined amount to cause a pre-determined amount of attenuation. The correspondence of angle of rotation and attenuation may be stored in a memory so that rotation may be controlled by a microprocessor.

DETAILED DESCRIPTION OF THE PREFERRED EMBODIMENT

Figure 1:
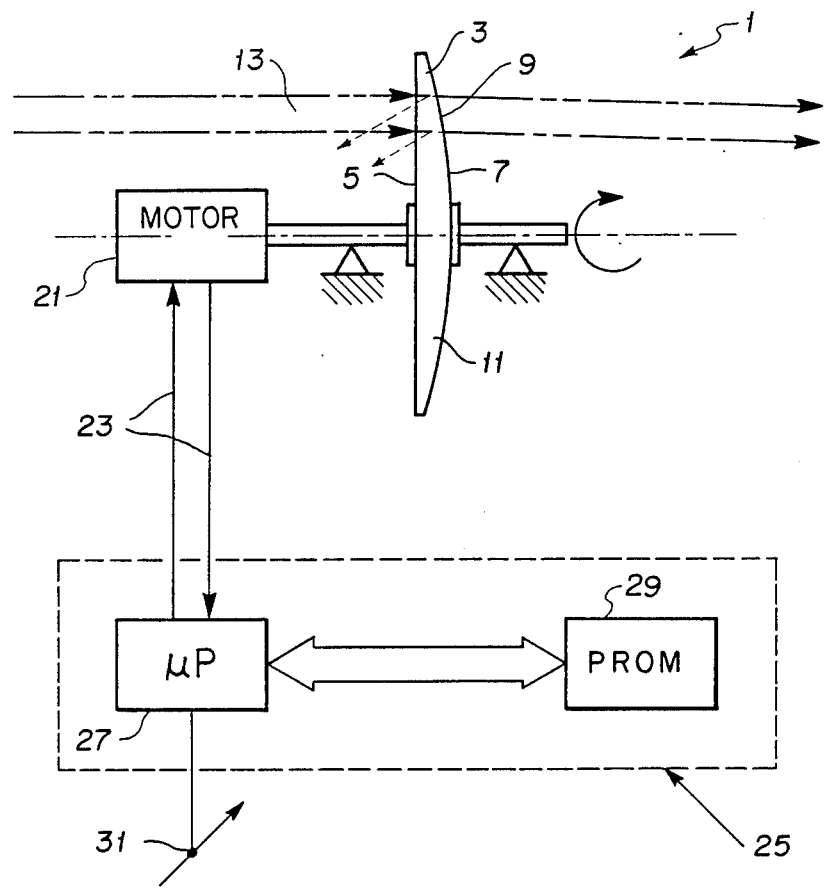
FIG. 1 shows an optical attenuator system that is constructed in accordance with the preferred embodiment of the present invention.

FIG. 1 shows an optical attenuator system 1 that is constructed in accordance with the preferred embodiment of the present invention. The system 1 includes an axially symmetric attenuator 3 which is fabricated as a plano-convex lens 11. An incoming light beam 13 enters the lens 11 through an uncoated incoming optically transmissive surface 5 and exits through an outgoing optically transmissive surface 7 at a small angle of refraction. An optical attenuation coating 9 applied to the surface 7 attenuates the beam 13 by an amount depending upon the angle of rotation of the attenuator 3. The surface 5 is orthogonal to the beam 13 and the surface 7 is inclined relative to the surface 5 so that light reflected by the coating 9 is reflected away from the optical path of the incoming beam 13.

The attenuator 3 may be fabricated from the plano-convex lens 11 or from other optical designs in which light reflected by the coating 9 is reflected away from the optical path rather than back along the optical path.

In addition, the surface 5 may also be curved to cause any reflection at the surface 5 not to travel back along the optical path. This will be especially important if a coating is applied to the surface 5 instead of, or in addition to, the coating 9 on the surface 7. Alternatively, the lens 11 may be fabricated as a semicircle or as an open ring instead of being axially symmetric. Of course, the angle of refraction of the beam 13 by the lens 11 must be held constant at all angular positions of the attenuator 3 to ensure adequate focusing of the beam 13.

For ease of production, it may be advantageous to manufacture one or both of the surfaces 5, 7 as a spherical or a conical curve. In the case of a spherical curve, the radius of curvature should be many times larger than the diameter of the beam 13 to ensure minor reflection and low focusing or dispersion effects. A radius of curvature of 14 to 16 meters may be particularly well suited for attenuation of a laser beam.

The attenuator 3 may be rotated by a control motor 21 to set the desired amount of attenuation. The motor 21 is controlled by a motor controller 25 including a microprocessor 27 and a programmable read only memory (PROM) 29.

A selector switch 31 may be used to select a desired amount of attenuation. The microprocessor 27 then reads the necessary angle of rotation from the PROM 29 and controls the motor 21 through lines 23 to adjust the attenuator 3 to the correct angle.

Figure 2:
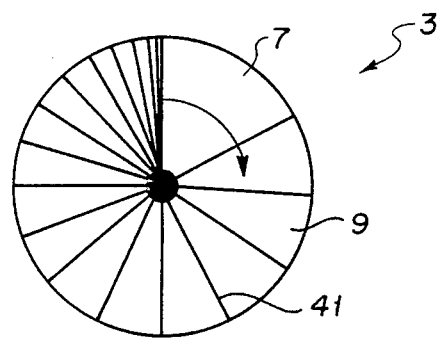
FIG. 2 shows a front view of the attenuator shown in FIG. 1.

FIG. 2 shows the surface 7 of the attenuator 3 on which the coating 9 is applied. The variation in optical density of the coating 9 with angle of rotation is illustrated by lines 41 with the more closely spaced lines 41 depicting regions of higher optical density. In reality, the coating 9 appears as a homogenous layer to the unaided human eye. The coating 9 may be deposited on lens 11, e.g., by an evaporation process.

We claim:

1. An optical attenuator for receiving a light beam along an optical path and for attenuating the light beam, comprising:
    an incoming optically transmissive surface which intersects the optical path and is axially symmetric about an axis of rotation;
    an outgoing optically transmissive surface which intersects the optical path and is axially symmetric about an axis of rotation which is aligned with the axis of rotation of the incoming surface;
    an attenuating coating affixed to one of the incoming and outgoing surfaces to form a coated surface;
    wherein the axes of rotation are displaced from the optical path; and
    wherein the incoming and outgoing surfaces are inclined relative to each other such that a portion of the light beam reflected by the coated surface is directed away from the optical path.

2. An optical attenuator as in claim 1, wherein the attenuating coating varies in amount of attenuation with angle of rotation of the coated surface about its axis of rotation.

3. An optical attenuator as in claim 2, further comprising:
    a motor, coupled to the coated surface, for rotating the coated surface about its axis of rotation;
    selector means for selecting a desired amount of attenuation;

memory means, coupled to the selector means, for containing a correlation of attenuation amounts and rotation angles; and a controller, coupled to the motor and to the memory means, for receiving a desired rotation angle from the memory means and for directing the motor to rotate the coated surface to the desired rotation angle.

4. An optical attenuator as in claim 3, wherein the amount of attenuation of the attenuating coating varies continuously with angle of rotation of the coated surface about its axis of rotation.

5. An optical attenuator as in claim 1, wherein the incoming and outgoing surfaces comprise surfaces of a plano-convex lens.

6. An optical attenuator as in claim 1, wherein the incoming and outgoing surfaces each have a disc shape.

7. An optical attenuator as in claim 1, wherein the incoming and outgoing surfaces are each spherically curved.

8. An optical attenuator as in claim 7, wherein the radii of curvatures of the incoming and outgoing surfaces are much larger than the diameter of the light beam.

9. An optical attenuator as in claim 7, wherein the radii of curvatures of the incoming and outgoing surfaces lie between 14 meters and 16 meters.

10. An optical attenuator as in claim 1, wherein the coated surface is inclined at a non-orthogonal angle relative to the light beam.

11. An optical attenuator as in claim 1, wherein:

an attenuating coating affixed to the incoming surface forms an incoming coated surface;

an attenuating coating affixed to the outgoing surface forms an outgoing coated surface; and both the incoming coated surface and the outgoing coated surface are inclined at non-orthogonal angles relative to the light beam.

* * * * *